United States Patent
Watanabe

(10) Patent No.: US 8,015,960 B2
(45) Date of Patent: Sep. 13, 2011

(54) VIBRATION-DAMPING CONTROL APPARATUS AND METHOD FOR INTERNAL COMBUSTION ENGINE

(75) Inventor: Satoru Watanabe, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 12/330,965

(22) Filed: Dec. 9, 2008

(65) Prior Publication Data

US 2009/0145381 A1    Jun. 11, 2009

(30) Foreign Application Priority Data

Dec. 10, 2007  (JP) ................................ 2007-318206

(51) Int. Cl.
*F02B 75/06* (2006.01)
*F02D 13/06* (2006.01)

(52) U.S. Cl. ................... 123/192.1; 123/198 F

(58) Field of Classification Search ............... 123/192.1, 123/198 F
See application file for complete search history.

(56) References Cited

U.S. PATENT DOCUMENTS

| | | | | |
|---|---|---|---|---|
| 5,020,491 | A * | 6/1991 | Mashino | 123/192.1 |
| 6,382,163 | B1 * | 5/2002 | Murray et al. | 123/192.1 |
| 6,883,476 | B1 | 4/2005 | Nohara et al. | |
| 6,943,460 | B2 * | 9/2005 | Wakashiro et al. | 290/40 C |
| 7,058,487 | B2 * | 6/2006 | Hara et al. | 701/22 |
| 7,140,355 | B2 * | 11/2006 | Michelini et al. | 123/481 |
| 7,377,250 | B1 * | 5/2008 | Duffy | 123/192.1 |
| 7,523,734 | B2 * | 4/2009 | Albertson et al. | 123/192.1 |
| 2005/0049108 | A1 | 3/2005 | Nishizawa et al. | |
| 2005/0066934 | A1 | 3/2005 | Kawamura | |
| 2006/0037578 | A1 | 2/2006 | Nakamura | |
| 2008/0154468 | A1 * | 6/2008 | Berger et al. | 701/54 |

FOREIGN PATENT DOCUMENTS

| | | |
|---|---|---|
| EP | 1 852 593 A1 | 11/2007 |
| JP | 61-65023 A | 4/1986 |
| JP | 3-36981 A | 2/1991 |
| JP | 4-209931 A | 7/1992 |
| JP | 4-299084 A | 10/1992 |
| JP | 7-189757 A | 7/1995 |
| JP | 2002-231528 A | 8/2002 |

(Continued)

OTHER PUBLICATIONS

Chinese Office Action with English translation dated Nov. 29, 2010 (Seventeen (17) pages).

(Continued)

*Primary Examiner* — Noah Kamen
(74) *Attorney, Agent, or Firm* — Crowell & Moring LLP

(57) ABSTRACT

An apparatus and method of controlling vibration-damping for a vehicular internal combustion engine. The combustion is temporarily stopped in some cylinders among a plurality of cylinders, and the engine is operated by the remaining cylinders. Then, a variable valve mechanism which varies a valve lift amount of at least one of intake and exhaust valves of each cylinder is controlled, to decrease the valve lift amount of at least one of the intake and exhaust valves of each cylinder in which the combustion is temporarily stopped. Further, a rotating electric machine having at least one of functions of an electric motor and a generator is controlled, to apply torque to an output shaft of the engine thereby suppressing torque variation in the output shaft at the time when the combustion is temporarily stopped in some cylinders, so that the torque variation due to uneven explosion intervals is reduced.

13 Claims, 16 Drawing Sheets

FOREIGN PATENT DOCUMENTS

| | | |
|---|---|---|
| JP | 2004-116301 A | 4/2004 |
| JP | 2005-9363 A | 1/2005 |
| JP | 2005-67591 A | 3/2005 |
| JP | 2005-98202 A | 4/2005 |
| JP | 2006-57535 A | 3/2006 |
| JP | 2007-239716 A | 9/2007 |

OTHER PUBLICATIONS

Korean Office Action with English translation dated Feb. 10, 2011 (nine (9) pages).

Japanese Office Action dated Jun. 21, 2011 with English translation (eight (8) pages).

* cited by examiner

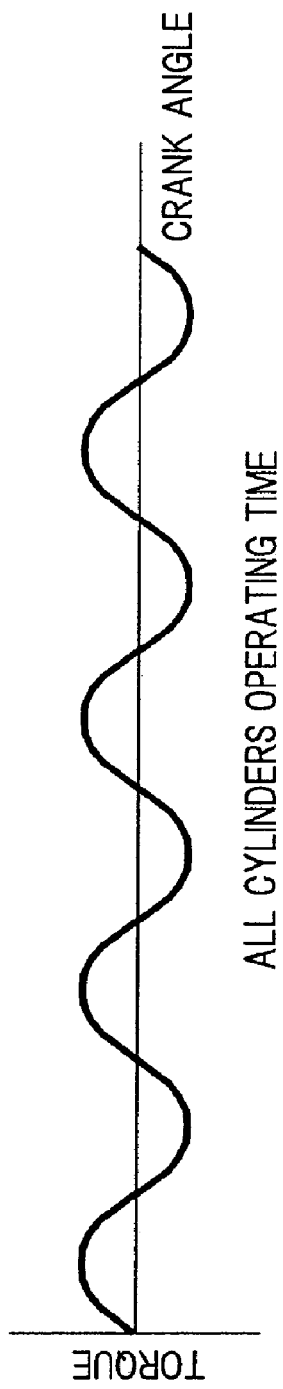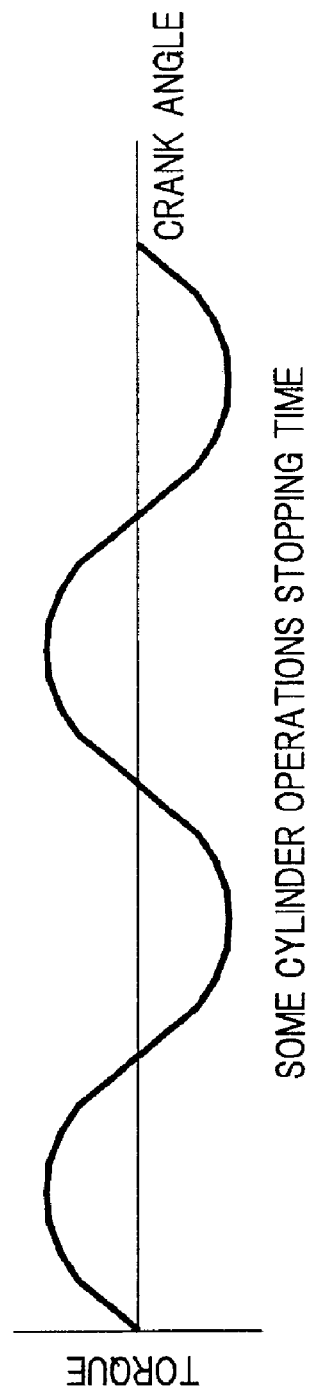

VIBRATION-DAMPING CONTROL APPARATUS AND METHOD FOR INTERNAL COMBUSTION ENGINE

BACKGROUND OF THE INVENTION

1. Field of the Invention

The present invention relates to a technology for temporarily stopping the combustion in some cylinders of an internal combustion engine for a vehicle, and also, for holding at least one of an intake valve and an exhaust valve of each cylinder in which the combustion is temporarily stopped, at a low valve lift amount state or at a valve closing state. In particular, the present invention relates to a technology for reducing torque variation due to uneven explosion intervals at the time when the combustion is temporarily stopped in some cylinders (to be referred to as some cylinder operations temporarily stopping time, hereunder).

2. Description of the Related Art

In an internal combustion engine disclosed in Japanese Laid-open (Kokai) Patent Application Publication No. H7 (1995)-189757, in a low load operating region, in order to reduce a pumping loss, the combustion is temporarily stopped in some cylinders. As a result, torque variation due to an inertia force of a piston system is reduced, so that the vibration of the internal combustion engine is reduced.

Further, in an internal combustion engine disclosed in Japanese Laid-Open (Kokai) Patent Application Publication No. S61 (1986)-65023, when all cylinders are operated (to be referred to as all cylinders operating time, hereunder), a torque is applied to a crankshaft using a motor/generator, to reduce torque variation due to an explosion force of the internal combustion engine and torque variation due to an inertia force of a piston system.

However, in the internal combustion engine disclosed in Japanese Laid-open (Kokai) Patent Application Publication No. H7-189757, at some cylinder operations temporarily stopping time, the torque variation occurs as a result that the explosion and combustion at each constant crank angle cannot be maintained, and also, the torque variation occurs by the torque, which prevents the rotation of the crankshaft (to be referred to as a negative torque, hereunder) and is applied to the crankshaft in an expansion stroke of each cylinder in which the combustion is temporarily stopped. Such torque variation is called torque variation due to uneven explosion intervals. Thus, even in the internal combustion engine disclosed in Japanese Laid-open (Kokai) Patent Application Publication No. H7-189757, the torque variation due to the uneven explosion intervals cannot be reduced, and accordingly, the reduction in the vibration of the interval combustion engine might be insufficient.

Further, in Japanese Laid-Open (Kokai) Patent Application Publication No. S61-65023, there is not especially disclosed a control of the motor/generator at some cylinder operations temporarily stopping time.

SUMMARY OF THE INVENTION

The present invention has been accomplished in view of the above problems, and an object of the present invention is to reduce torque variation occurring when the combustion is temporarily stopped in some cylinders, using a rotating electric machine provided with at least one of functions of an electric motor and a generator.

In order to achieve the above object, the present invention provides such a novel technical concept of:

temporarily stopping the combustion in some cylinders among a plurality of cylinders in an internal combustion engine, and performing the combustion in the remaining cylinders other than the cylinders in which the combustion is temporarily stopped, to operate the internal combustion engine;

controlling a variable valve mechanism which varies a valve lift amount of at least one of an intake valve and an exhaust valve of each cylinder in the Internal combustion engine, to thereby decrease the valve lift amount of at least one of the intake valve and the exhaust valve of each cylinder in which the combustion is temporarily stopped; and controlling the rotating electric machine provided with at least one of functions of the electric motor and the generator, to thereby apply, to an output shaft, a torque for suppressing torque variation in the output shaft in the internal combustion engine at the time when the combustion is temporarily stopped in some cylinders.

The other objects and features of this invention will be understood from the following description with reference to the accompanying drawings.

BRIEF DESCRIPTION OF THE DRAWINGS

FIG. 6 is a diagram exemplarily illustrating a relation between a crank angle and a torque acting on a crankshaft, in which 6A illustrates the relation at all cylinders operating time in a conventional configuration, and 6B illustrates the relation at some cylinder operations temporarily stopping time, in the conventional configuration;

DESCRIPTION OF PREFERRED EMBODIMENTS

Figure 1:
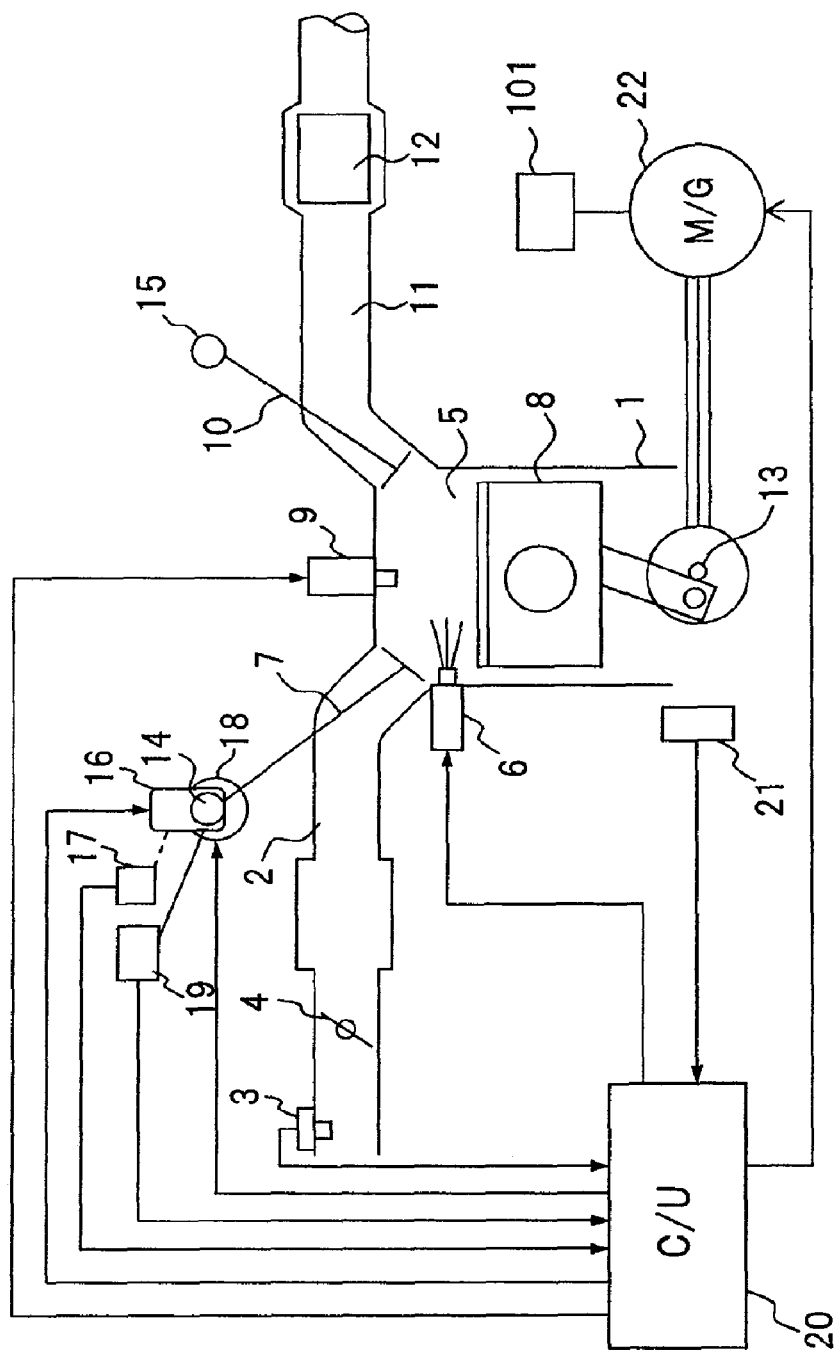
FIG. 1 is a system configuration diagram of a first embodiment according to the present invention.

FIG. 1 is a diagram illustrating a system configuration of an internal combustion engine provided with a variable valve mechanism, according to a first embodiment of the present invention.

In an intake passage 2 of an internal combustion engine 1, there is disposed an air flow meter 3 for detecting an intake air amount Q, and on the downstream side thereof, a throttle valve 4 which controls the intake air amount Q is disposed.

Further, there is disposed a fuel injection valve 6 which injects fuel into a combustion chamber 5 of each cylinder on the downstream of intake passage 2. The air-fuel mixture of the fuel injected from fuel injection valve 6 and the air sucked via throttle valve 4 and an intake valve 7 is compressed by a piston 8 in combustion chamber 5 to be spark ignited by an ignition plug 9 disposed in combustion chamber 5.

The combusted exhaust gas from internal combustion engine 1 is exhausted from combustion chamber 5 via an exhaust valve 10 to an exhaust passage 11, and thereafter, is discharged into the atmosphere via an exhaust purifying catalytic converter 12 disposed in exhaust passage 11.

Intake valve 7 and exhaust valve 10 are driven to open or close by operations of cams respectively disposed on an intake camshaft 14 and an exhaust camshaft 15, by means of a crankshaft 13 (output shaft) as a power source.

On the intake side, a variable valve lift amount control device (to be referred to as variable valve event and lift, VEL, hereunder) 16 configured by an articulated link mechanism which continuously and variably controls a valve lift amount of intake valve 7 and an operating angle thereof is disposed on an outer periphery of intake camshaft 14.

Further, to VEL 16, a VEL operating angle sensor 17 for detecting the valve lift amount of intake valve 7 and the operating angle thereof is also disposed. A detailed structure of VEL 16 will be described later.

Also, on the intake side, a variable valve timing control mechanism (to be referred to as VTC, hereunder) 18 configured by a mechanism which continuously and variably controls a difference between rotating phases of crankshaft 13 and intake camshaft 14 to advance or retard valve timing (opening/closing timing) of intake valve 7 is disposed on one end of intake camshaft 14.

Further, on the other end of intake camshaft 14, an intake cam angle sensor 19 for detecting a rotating position of intake camshaft 14 is also disposed.

An engine control unit (to be referred to as ECU, hereunder) 20 obtains an engine load and an engine rotating speed, based on an output signal from air flow meter 3 and a crank angle signal output from a crank angle sensor 21 disposed on crankshaft 13 for detecting a rotating position of crankshaft 13. Then, ECU 20 computes a fuel injection amount, a target valve lift amount of VEL 16 and target valve timing of VTC 18. Further, ECU 20 outputs a feedback control signal to VEL 16 so that an actual valve lift amount of VEL 16 converges into the target valve lift amount, based on an operating angle signal output from VEL operating angle sensor 17. Similarly, ECU 20 obtains actual valve timing of VTC 18 based on a phase difference between an output signal from an intake cam angle sensor 19 and the crank angle signal output from crank angle sensor 21, and outputs a feedback control signal to VTC 18 so that the actual valve timing of VTC 18 converges into target valve timing.

Figure 2:
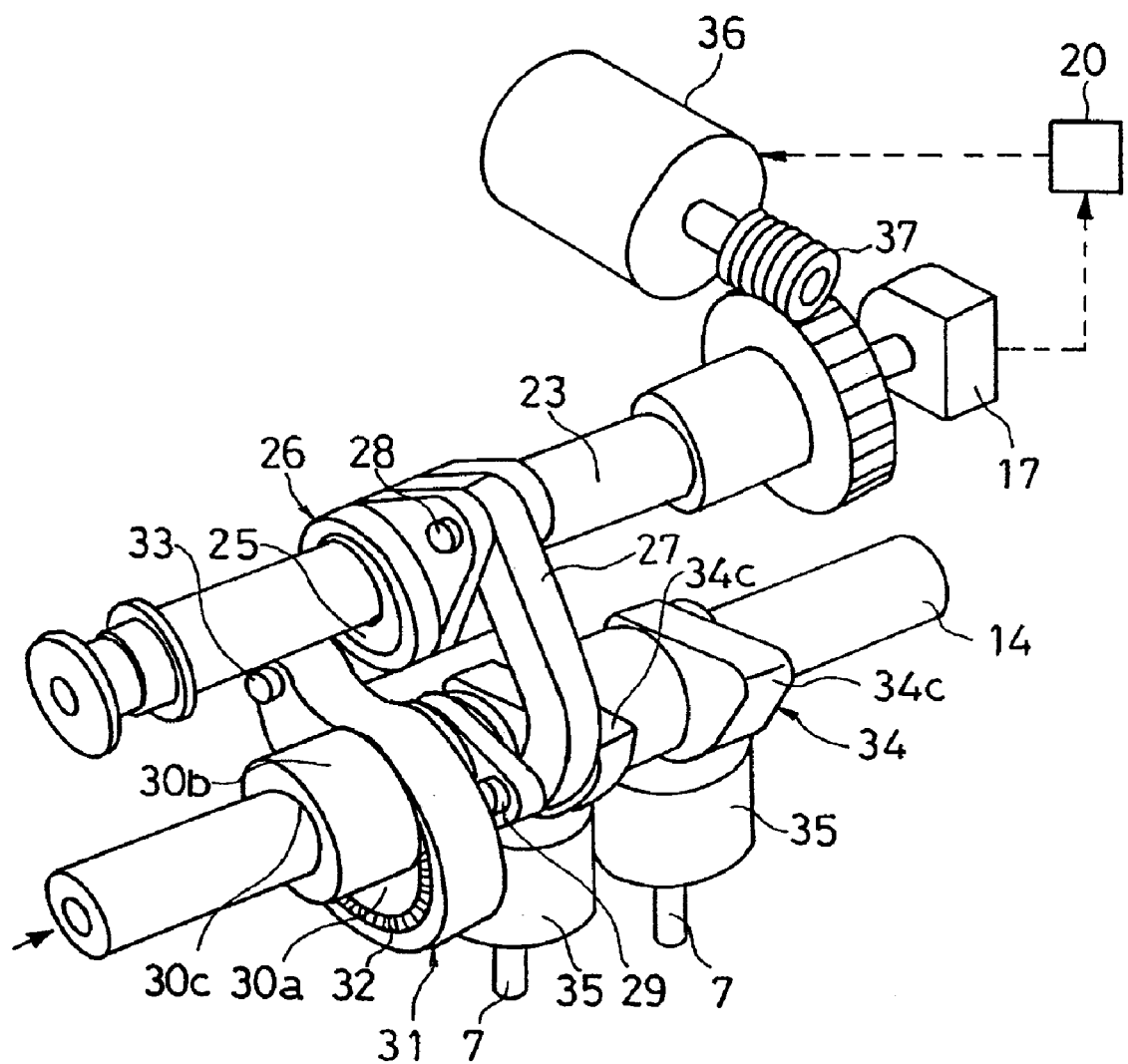
FIG. 2 is a perspective view illustrating a main part of a variable valve mechanism used in the first embodiment according to the present invention.
Figure 3:
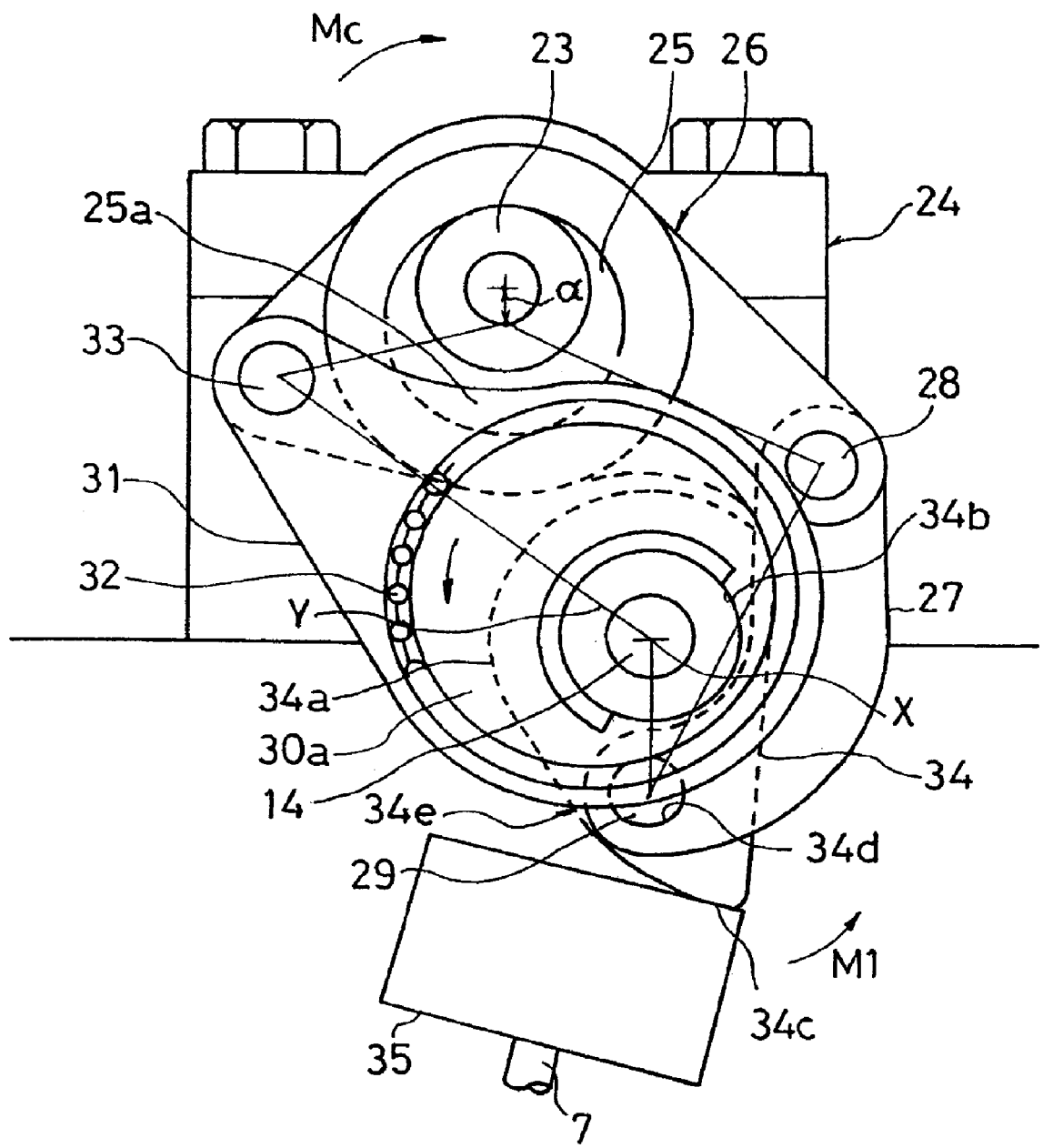
FIG. 3 is a diagram viewed from the arrow A of FIG. 2.

Next, there will be described VEL 16 based on FIG. 2 and FIG. 3.

A control shaft 23 of VEL 10 is arranged in parallel to intake camshaft 14 and is supported by a bearing 24 fixed to a cylinder block (not shown in the figure) at both ends thereof.

A control cam 25 formed in a substantially cylindrical shape having an outer diameter larger than that of control shaft 23, is disposed in a state where an axle center thereof is biased to an axle center of control shaft 23 by a predetermined amount α.

A rocker arm 26 is formed in a substantially rhombic shape, and an outer periphery of control cam 25 is slidably inserted into a hole formed through a center of rocker arm 26.

A link rod 27 formed in a substantially crescent shape, is rotatably connected to one end portion of rocker arm 26 via a pin 28 at one end thereof, and is rotatably connected to a position biased from an axle center of intake camshaft 14 via a pin 29 at the other end thereof.

A drive cam 30 comprises a cam body 30a formed in a cylindrical shape having a large outer diameter and a cylindrical portion 30b having a small outer diameter which is disposed to be adjacent to one end of cam body 30a. Through a center portion of cylindrical portion 30b, a shaft hole 30c is formed so that intake camshaft 14 is slidably inserted into shaft hole 30c. Further, an axle center of cylindrical portion 30b is coincident with the axle center X of intake camshaft 14, but an axle center Y of cam body 30a is biased from the axle center X of intake camshaft 14 by a predetermined amount.

A link arm 31 is formed in an annular shape having an outer periphery larger than that of drive cam 30, and an outer periphery of cam body 30a of drive cam 30 is slidably inserted into a hole formed though a center portion of link arm 31 via a bearing 32. Further, an end portion of link arm 31, which protrudes to an outer diameter direction, is rotatably connected to the other end of rocker arm 26 via a pin 33.

An intake cam 34 is formed in a rain-drop shape, and intake camshaft 14 is inserted into a shaft hole 34b formed through a base end portion 34a to be fixed to intake cam 34. On the other hand, a pin hole 34d is formed through a cam nose portion 34c positioned on an end portion which protrudes to an outer diameter direction from base end portion 34a, and pin 29 is fitted into pin hole 34d so that intake cam 34 is rotatably connected to link rod 27.

A valve lifter 35 is formed in a cylindrical shape with a lid, and a cam face 34e of intake cam 34 is in contact with a predetermined position of an upper surface of valve lifter 35 according to a swing position, while intake valve 7 being fixed to a lower portion of valve lifter 35.

An electric actuator 36 is engaged with a gear fixed to one end portion of control shaft 23 at a worm gear 37 thereof fixed to a drive shaft end portion, to rotate control shaft 23 within a fixed range based on a drive signal output from ECU 20.

Further, a VEL operating angle sensor 17 which is disposed on one end of control shaft 23, detects the valve lift amount of VEL 16 based on a rotating amount of control shaft 23 to output a signal of the detected lift amount to ECU 20.

Next, there will be described the operation principle of VEL 16.

Figure 4A:
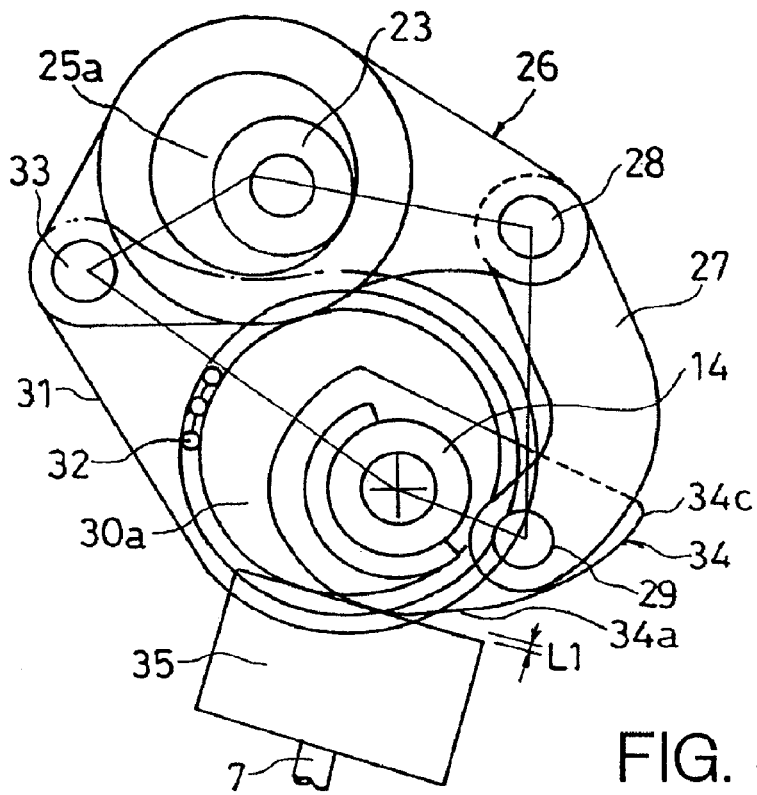
FIG. 4 is a functional explanation diagram in which 4A illustrates a valve opening state at the time when a valve lift amount varied by the variable valve mechanism is minimum, and 4B illustrates a valve closing state at the time when the valve lift amount is minimum.
Figure 4B:
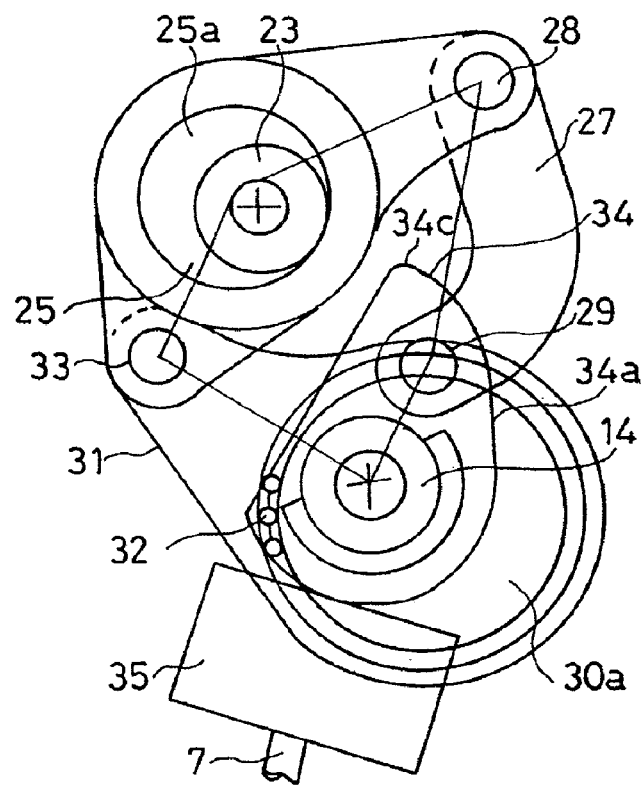

FIGS. 4A and 4B represent a valve opening state and a valve closing state of intake valve 7 when a lift amount of intake valve 7 is controlled to be minimum. In FIG. 4, when VEL 16 receives the drive signal from ECU 20, if a clockwise rotation is imparted to control shaft 23 in order to control the valve lift amount at minimum, a thick portion 25a of control cam 25 moves upwards and in synchronism with this movement, rocker arm 26 also moves upwards.

At this time, cam nose portion 34c of intake cam 34 is lifted upwards via link rod 27. Therefore, cam surface 34e of intake cam 34, which is in contact with valve lifter 35, approaches base end portion 34a according to the rotation of intake camshaft 14, so that the valve lift amount is controlled at a small lift amount shown by L1 in the figure.

Figure 5A:
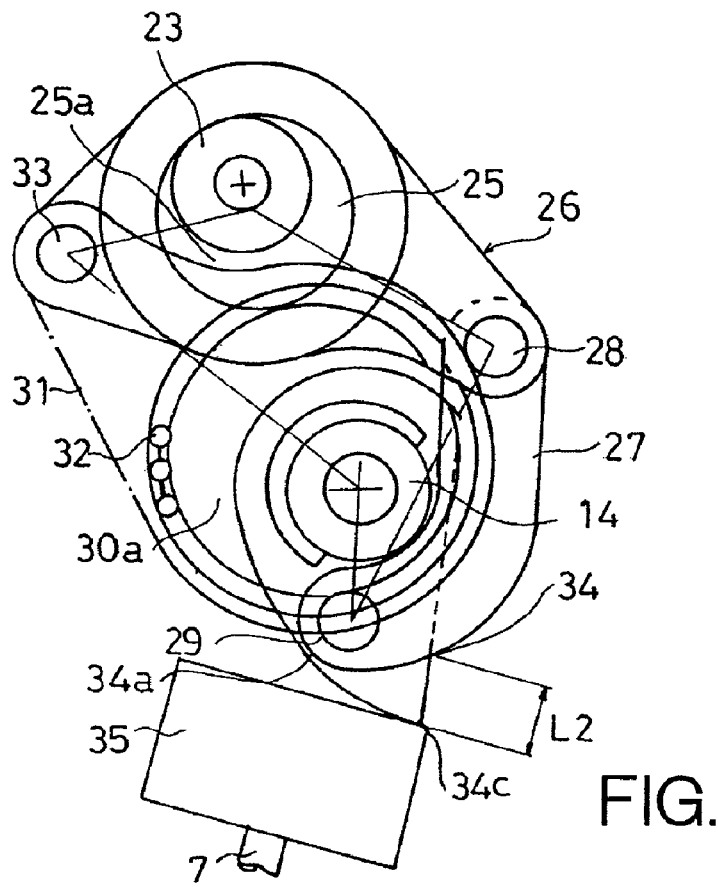
FIG. 5 is a functional explanation diagram in which 5A illustrates the valve opening state at the time when the valve lift amount varied by the variable valve mechanism is maximum, and 5B illustrates the valve closing state at the time when the valve lift amount is maximum.
Figure 5B:
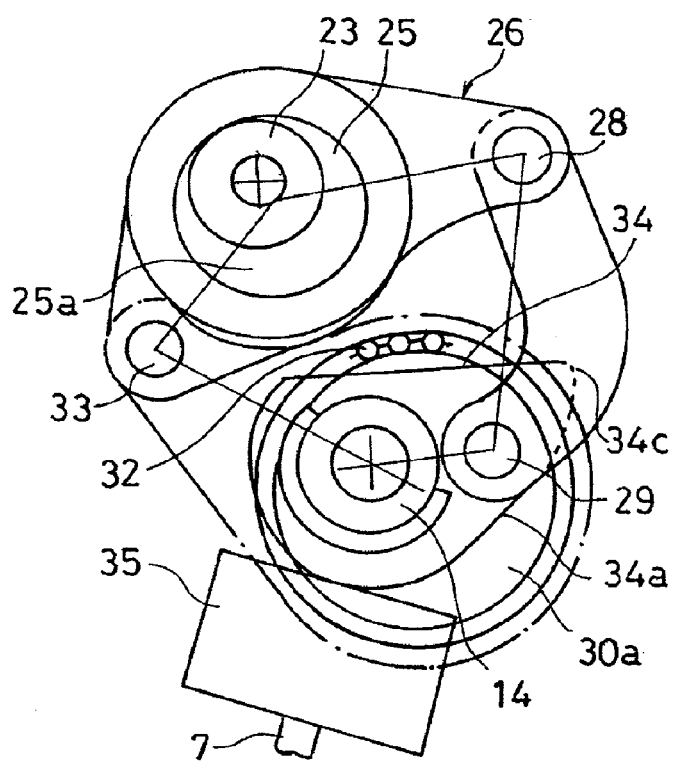

On the other hand, FIGS. 5A and 5B represent the valve opening state and the valve closing state of intake valve 7 when a lift amount of intake valve 7 is controlled to be maximum. In FIG. 5, when VEL 16 receives the drive signal from ECU 20, if a counter-clockwise rotation is imparted to control shaft 23 in order to control the valve lift amount at maximum, thick portion 25a of control cam 25 moves downwards and in synchronism with this movement, rocker arm 26 also moves downwards.

At this time, cam nose portion 34c of intake cam 34 is pressed downwards via link rod 27. Therefore, cam surface 34e of intake cam 34, which is in contact with valve lifter 35, covers between a tip end of cam nose portion 34c and base end portion 34a according to the rotation of intake camshaft 14, so that the valve lift amount is controlled at a large lift amount shown by L2 in the figure.

Incidentally, in a conventional internal combustion engine disclosed in Japanese Laid-Open (Kokai) Patent Application Publication No. H7-189757, as shown in FIG. 6 for example, if torque variation occurs in the crankshaft due to uneven explosion intervals at some cylinder operations stopping time (refer to FIG. 6B), torque variation amplitude is increased compared with that at all cylinders operating time (refer to FIG. 6A).

Therefore, especially, in a low load and low rotation operating region where the torque variation due to an explosion force of the internal combustion engine is susceptible to be increased, it is hard to perform an idling operation at a lower engine rotating speed, resulting in a negative effect on an improvement of fuel consumption.

Figure 7:
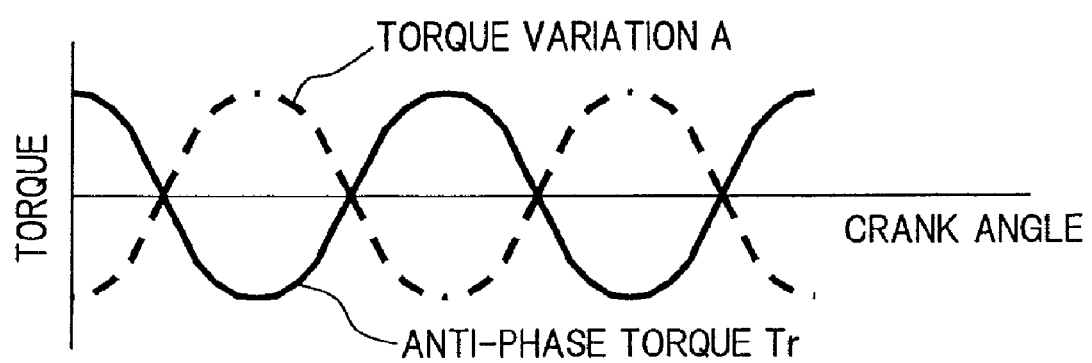
FIG. 7 is an explanatory diagram of a torque for vibration-damping at some cylinder operations temporarily stopping time according to the first embodiment of the present invention.

In the present embodiment, a motor/generator 22 (rotating electric machine) operating as an electric motor or a generator is disposed so as to mutually transmit a torque to/from crankshaft 13 via a timing belt or the like. Then, as illustrated in FIG. 7 for example, motor/generator 22 outputs an anti-phase torque Tr (to be referred to as a vibration-damping torque, hereunder) opposite to torque variation A of crankshaft 13 due to the uneven explosion intervals at some cylinder operations stopping time, to thereby offset the torque variation A.

Incidentally, another configuration may be used as the motor/generator, if a rotor (not shown in the figure) is capable of mutually transmitting the vibration-damping torque to/from crankshaft 13. For example, as disclosed in Japanese Laid-Open (Kokai) Patent Application Publication No. S61-65023, the motor/generator can be configured such that a rotor is incorporated into a flywheel, a ring gear of a differential gear or the like, and also, a plurality of stators is disposed around the rotor.

Motor/generator 22 is connected to a battery 101 (a first electric power storage device). In outputting the vibration-damping torque, when a positive torque for accelerating the rotation of crankshaft 13 is output, motor/generator 22 is supplied with the electric power from battery 101 to be driven as the electric motor. On the other hand, when a negative torque for preventing the rotation of crankshaft 13 is output, motor/generator 22 generates the electric power as the generator, and the generated electric power is charged to battery 101.

Incidentally, motor/generator 22, when configured for vibration-damping of internal combustion engine 1, is enough to provide with capacity of driving or power generating at a degree capable of offsetting the torque variation in crankshaft 13, and as a result, cost performance can be suppressed at minimum.

With the disposition of motor/generator 22 described above, ECU 20 has functions as described below, in addition to the above configuration and the like. Firstly, ECU 20 detects rotating variation in crankshaft 13 based on a cycle of signal input from crank angle sensor 21, and estimates the torque variation in crankshaft 13 which occurs the rotating variation, based on the detected rotating variation. Next, ECU 20 extracts components of the torque variation in crankshaft 13 due to the uneven explosion intervals, from the estimated torque variation. Further, ECU 20 sets the vibration-damping torque to be output by motor/generator 22, in order to offset the torque variation in crankshaft 13 due to the uneven explosion intervals. Then, ECU 20 outputs a control signal to motor/generator 22, so that motor/generator 22 is driven as the electric motor or generates the electric power as the generator, to output the vibration-damping torque.

Incidentally, by disposing a torque sensor, ECU 20 may directly detect the torque variation in crankshaft 13 in place of estimating the torque variation in crankshaft 13 based on the rotating variation in crankshaft 13. Further, a relation between operating conditions of internal combustion engine 1 previously obtained by experiments or the like and the torque variation in crankshaft 13 may be stored in a map, a table or the like of ECU 20, so that the torque variation in crankshaft 13 is obtained based on the map, the table or the like. Or, the torque variation in crankshaft 13 obtained based on the map, the table or the like may be corrected according to the detected rotating variation in crankshaft 13.

Next, there will be described a control of VEL 16 and motor/generator 22.

Figure 8:
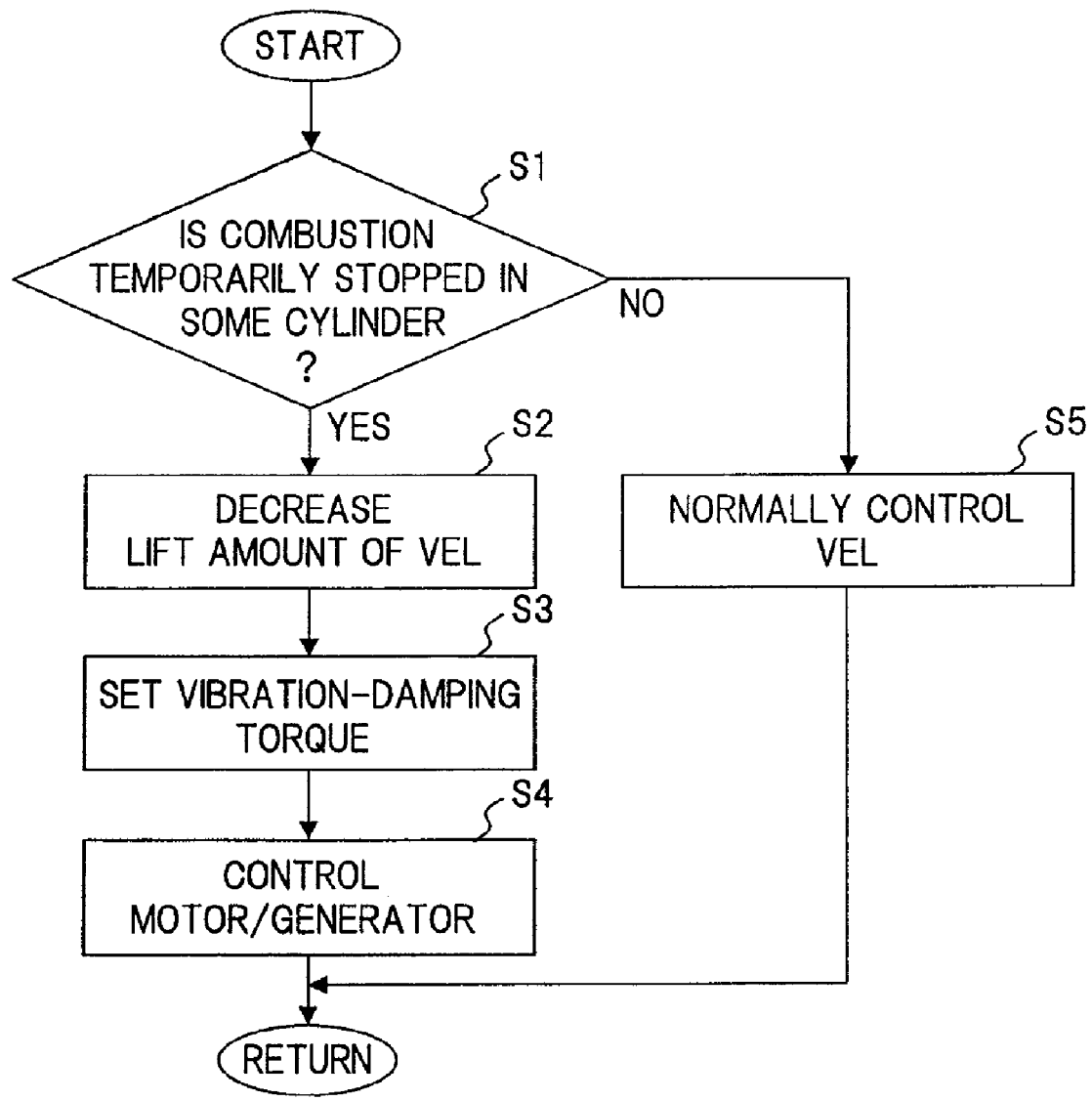
FIG. 8 is a flowchart according to the first embodiment of the present invention.

FIG. 8 illustrates a flowchart indicating the control of the VEL and the motor/generator executed by the ECU in the present embodiment.

In step S1, it is judged whether or not some cylinders among a plurality of cylinders are not operated.

If it is judged in step S1 that some cylinders are not operated (i.e., some cylinder operations temporarily stopping time), the routine proceeds to step S2.

In step S2, in the cylinders in which the combustion is temporarily stopped, the clockwise rotation is imparted to control shaft 23 as shown in FIG. 4, to thereby decrease the valve lift amount of intake valve 7, and the routine proceeds to step S3. The valve lift amount of intake valve 7 is decreased to a minimum value for example.

Note, in order to maintain intake valve 7 at a slightly opened state in step S2, an electromagnetic valve, a holding mechanism or the like can also be disposed.

In step S3, based on a flowchart in FIG. 9 to be described later, the vibration-damping torque to be output by motor/generator 22 is set, and the routine proceeds to step S4.

In step S4, the control signal is output to motor/generator 22 so that the vibration-damping torque set in step S3 is output from motor/generator 22.

On the other hand, if it is judged in step S1 that it is not the time at which some cylinders are not operated, that is, it is judged in step 1 that all cylinders are operated, the routine proceeds to step S5 where VEL 16 is normally operated according to the operating conditions of internal combustion engine 1 without decreasing the valve lift amount of intake valve 7, differently from step S2.

Figure 9:
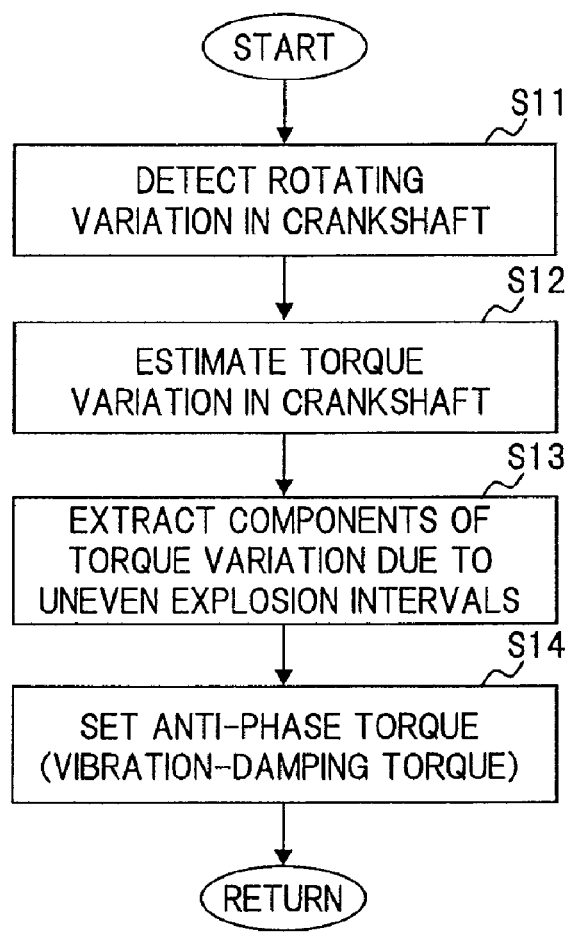
FIG. 9 is a flowchart illustrating the details of step S3 in FIG. 8.

FIG. 9 illustrates a flowchart of setting the vibration-damping torque according to step S3 of FIG. 8.

In step S11, the rotating variation in crankshaft 13 is detected based on the cycle of signal input from crank angle sensor 21, and the routine proceeds to step S12.

In step S12, based on the rotating variation in crankshaft 13, the torque variation (line "a" of FIG. 10) in crankshaft 13, which causes the rotating variation, is estimated, and the routine proceeds to step S13.

Figure 10:
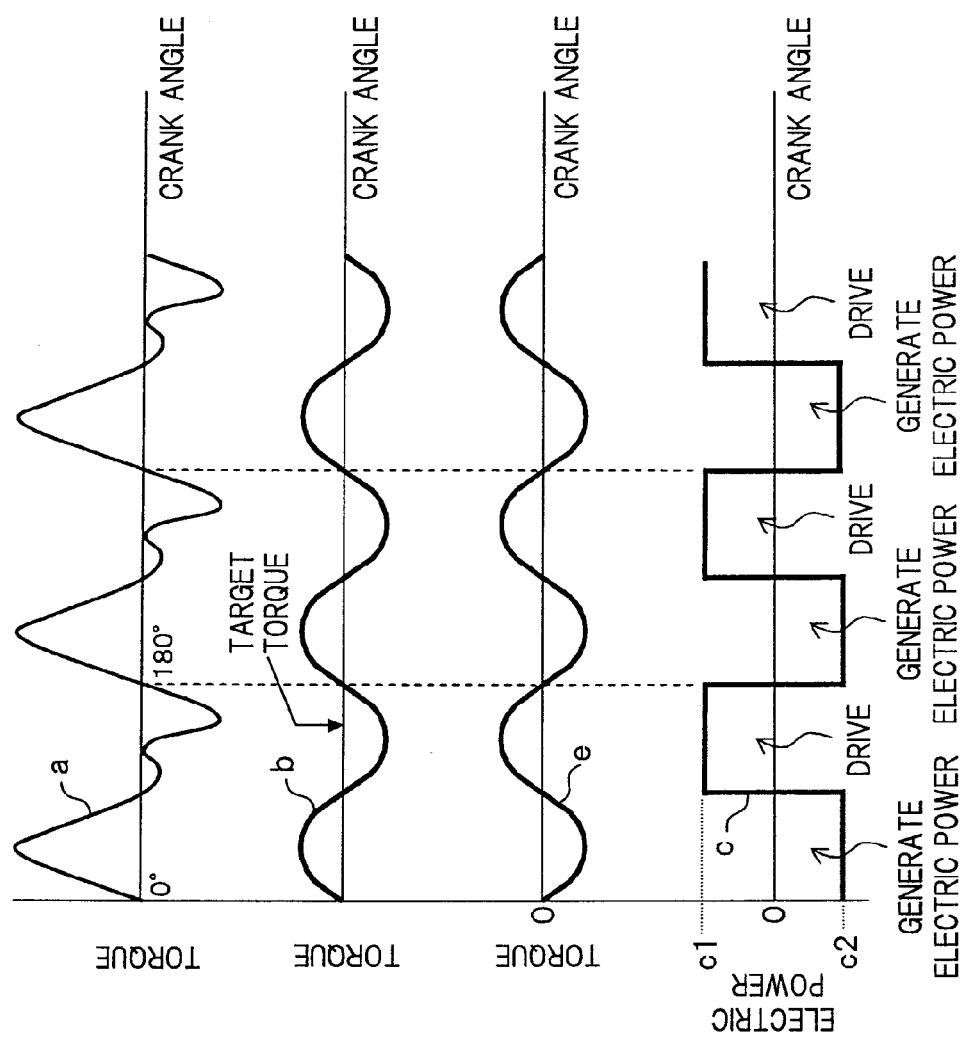
FIG. 10 is an explanatory diagram of rotating variation of the crankshaft and torque variation thereof, the torque for vibration-damping, and the changing-over of a rotating electric machine control, according to the first embodiment of the present invention.

Incidentally, the line "a" of FIG. 10 indicates the torque variation in crankshaft 13 containing, for example, components of the torque variation in crankshaft 13 due to an inertia force of a piston system, in addition to the components of the torque variation in crankshaft 13 due to the uneven explosion intervals.

In step S13, the components of the torque variation (line "b" of FIG. 10) in crankshaft 13 due to the uneven explosion intervals are extracted from the torque variation indicated by the line "a" of FIG. 10, and the routine proceeds to step S14.

In step S14, the vibration-damping torque (line "e" of FIG. 10) to be output by motor/generator 22 is set in order to offset the torque variation in crankshaft 13 due to the uneven explosion intervals extracted in step S13.

Figure 11:
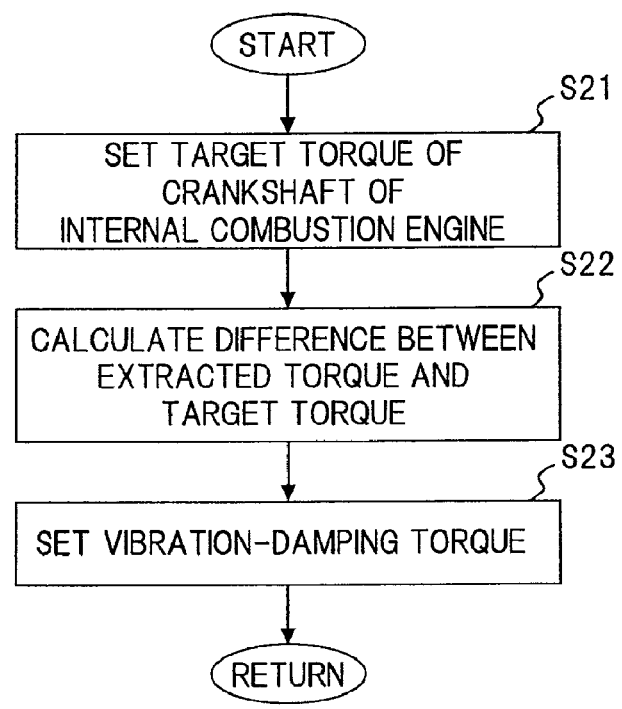
FIG. 11 is a flowchart illustrating the details of step S14 in FIG. 9.

FIG. 11 illustrates a flowchart of setting the vibration-damping torque according to step S14 in FIG. 9.

In step S21, a target torque of crankshaft 13 is set. In order to simplify the description, in FIG. 10, the target torque is indicated as a fixed value relative to a crank angle.

In step S22, the target torque is subtracted from the torque extracted in step S13 of FIG. 9 (the line "b" of FIG. 10) of crankshaft 13, which is varied due to the uneven explosion intervals, to thereby calculate a difference therebetween. It should be noted that the difference is a positive or negative value.

In step S23, based on the difference calculated in step S22, the magnitude and direction of the vibration-damping torque to be output by motor/generator 22 in order to offset the torque variation in crankshaft 13 due to the uneven explosion intervals are set.

Here, the direction of the vibration-damping torque is set for preventing the rotation of crankshaft 13 in a state where the torque of crankshaft 13 is larger than the target torque, while being set for accelerating the rotation of crankshaft 13 in a state where the torque of crankshaft 13 is smaller than the target torque.

Further, as an absolute value of the difference is larger, the magnitude of the vibration-damping torque is preferably set at a larger value, in order to enhance an effect of offsetting the torque variation in crankshaft 13 due to the uneven explosion intervals.

Incidentally, if the torque variation (the line "b" of FIG. 10) in crankshaft 13 due to the uneven explosion intervals extracted in step S13 is within a range where the operability, the comfort of crew and the like are not largely damaged, the output of the vibration-damping torque by motor/generator 22 may be cancelled.

According to the present embodiment, when the torque variation in crankshaft 13 due to the uneven explosion intervals is extracted as indicated by the line "b" of FIG. 10 for example, as indicated by the line "c" of FIG. 10, the applying of the positive torque by motor/generator 22 and the applying of the negative torque by motor/generator 22 are alternately changed over.

As a result, even if the torque variation in crankshaft 13 due to the uneven explosion intervals is increased at some cylinder operations stopping time compared with the torque variation in crankshaft 13 at all cylinders operating time, such increased torque variation in crankshaft 13 is offset by the vibration-damping torque (the line "e" of FIG. 10) output by motor/generator 22. Therefore, it is possible to suppress the vibration of internal combustion engine 1 or to ensure the vehicle driving performance. Consequently, even at a lower rotating speed of crankshaft 13, it becomes possible to perform a stable idling operation without the necessity of concerning the vibration excitation of internal combustion engine 1, to thereby obtain the excellent fuel consumption.

Here, it is also possible to shift or correct the line "c" of FIG. 10 as follows.

Figure 12A:
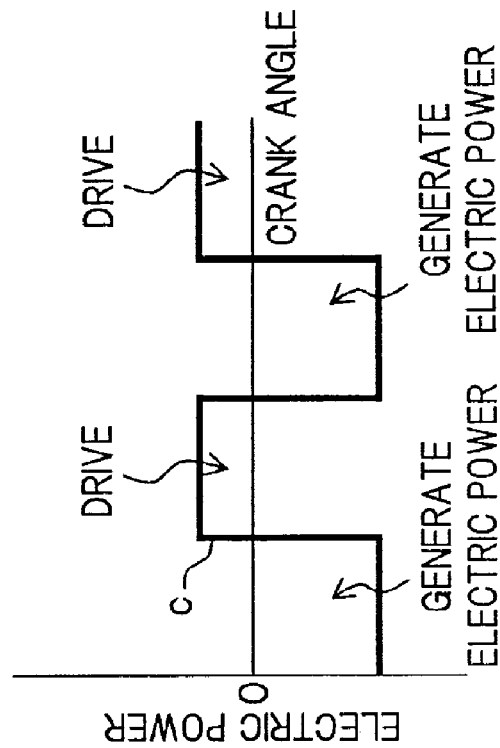
FIG. 12 is an explanatory diagram in which 12A illustrates a shift of a line "c" of FIG. 10 to a power consumption increasing side, and 12B illustrates the shift of the line "c" of FIG. 10 to a generated electric power increasing side.
Figure 12B:
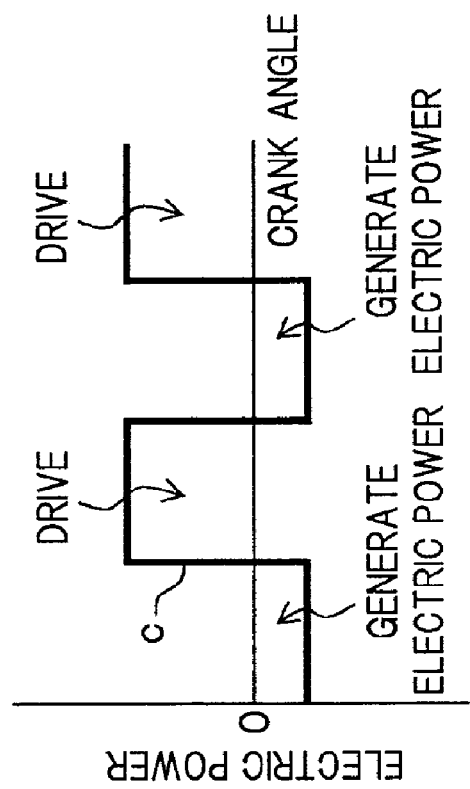

Firstly, the line "c" is shifted, as shown in FIG. 12A, for increasing the electric power consumption (an upper side in the illustration), or shifted, as shown in FIG. 12B, for increasing the generated electric power (a lower side in the illustration), so that a ratio between the electric power consumption and the generated electric power by motor/generator 22 can be controlled.

For example, in a state where a charged electric power residual amount in battery 101 is large, the line "c" is shifted to the upper side as shown in FIG. 12A to thereby increase the electric power consumption, so that the overcharge to battery 101 can be reliably avoided. On the other hand, in a state where the charged electric power residual amount in battery 101 is small, the line "c" is shifted to the lower side as shown in FIG. 12B, to thereby increase the generated electric power, so that over-discharge of battery 101 can be reliably avoided.

Alternatively, for example when the torque required for internal combustion engine 1 due to the use of in-car air conditioning equipment or the like, the line "c" is shifted to the upper side as shown in FIG. 12A to thereby increase the electric power consumption, so that the torque required for internal combustion engine 1 can be compensated. On the other hand, for example when an engine braking force is required for a vehicle, the line "c" is shifted to the lower side as shown in FIG. 12B to thereby increase the generated electric power, so that the engine braking force can be compensated.

Incidentally, when the line "c" is shafted for increasing the generated electric power, in order to compensate for torque deficiency in crankshaft 13 due to the electric power generating, internal combustion engine 1 may be controlled by ECU 20, to increase the output power thereof from a state where crankshaft 13 is at a lowest rotating speed or a state where crankshaft 13 is at a stable rotating speed.

Further, the electric power consumption (c1 of FIG. 10) or the generated electric power (c2 of FIG. 10) by motor/generator 22 can be corrected according to a maximum value of the electric power consumption or the generated electric power. As the maximum value, an average value of a plurality of maximum values obtained by the experiments or the like can be used.

For example, as a value of c1 is brought close to the maximum value of the electric power consumption by motor/generator 22, driving performance of motor/generator 22 can be further largely achieved in order to damp the vibration of internal combustion engine 1. Similarly, as a value of c2 is brought close to the maximum value of the generated electric power by motor/generator 22, generating performance of motor/generator 22 can be further largely achieved.

Here, for example if the correction of c1 is precedent to the correction of c2, it becomes possible to reliably ensure the stable idling operation without the necessity of concerning the vibration excitation of internal combustion engine 1 even at the lower rotating speed of crankshaft 13, to thereby obtain the excellent fuel consumption.

Incidentally, even though the electric power consumption or the generated electric power by motor/generator 22 is made utmost, it might fail to sufficiently suppress the torque variation in crankshaft 13 in some cases. Or, the use of the driving performance or the generating performance of motor/generator 22 might be insufficient for the vibration-damping, in the case where since the charged electric power residual amount in battery 101 is small although motor/generator 22 is to be driven, the generation of electric power is required to be precedent or the idling rotating speed is required to be precedent. In such a case, ECU 20 may retard ignition timing of ignition plug 9 for the cylinder to be combusted or may reduce an opening of throttle valve 4 or an opening of intake valve 7 of the cylinder to be combusted, to suppress the intake air amount, within a range where the rotating speed of crankshaft 13 can be maintained at a value close to a requested rotating speed. As a result, it is possible to reduce the torque of internal combustion engine 1 to thereby suppress the vibration of internal combustion engine 1.

Figure 13:
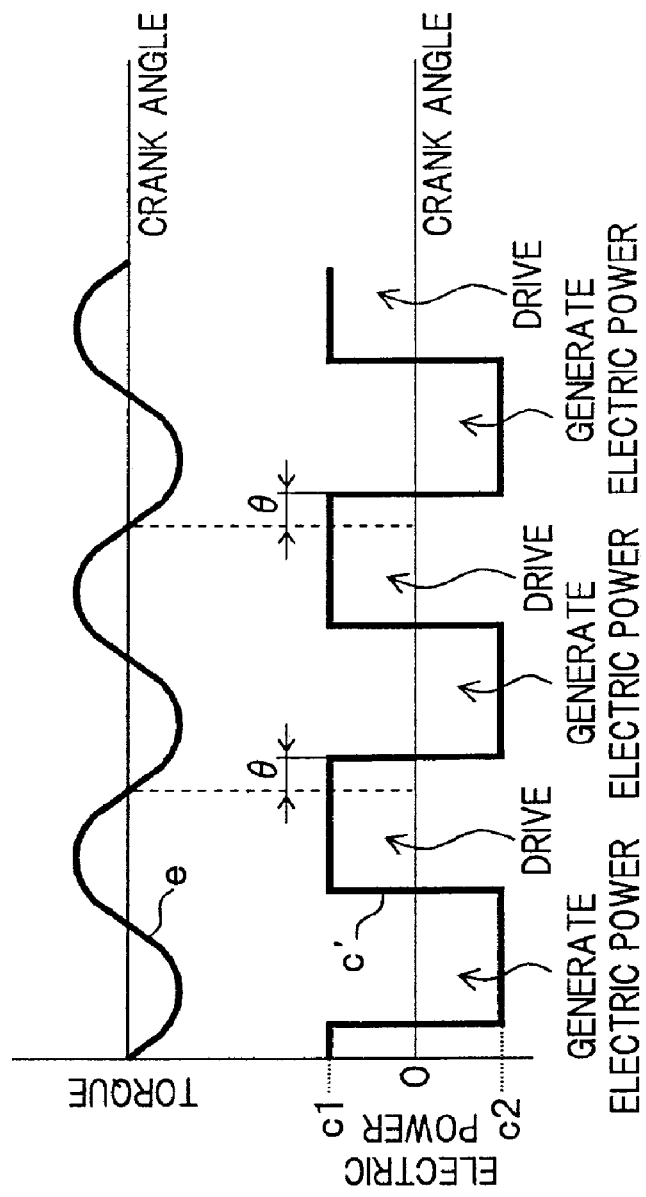
FIG. 13 is an explanatory diagram of a phase delay in the driving and electric-power generating of the rotating electric machine, according to the first embodiment of the present invention.

Also, the line "c" of FIG. 10 is corrected as shown by a line "c'" of FIG. 13. Namely, in some cases, a vibration-damping effect of the entire vehicle including internal combustion engine 1 can be improved by controlling the driving or the electric power generating of motor/generator 22 so as to cause a phase delay by θ relative to the vibration-damping torque (a line "e" of FIG. 13). This θ may be set at a value capable of sufficiently obtaining the vibration-damping effect, by a conformance test of the internal combustion engine to a real car or the like.

Next, in a second embodiment of the present invention, when the negative torque is output, motor/generator 22 is controlled by ECU 20 so that the driving thereof as the electric motor and the electric power generating thereof as the generator are changed over, according to an electric power state, for example, the charged electric power residual amount in battery 101.

Figure 14:
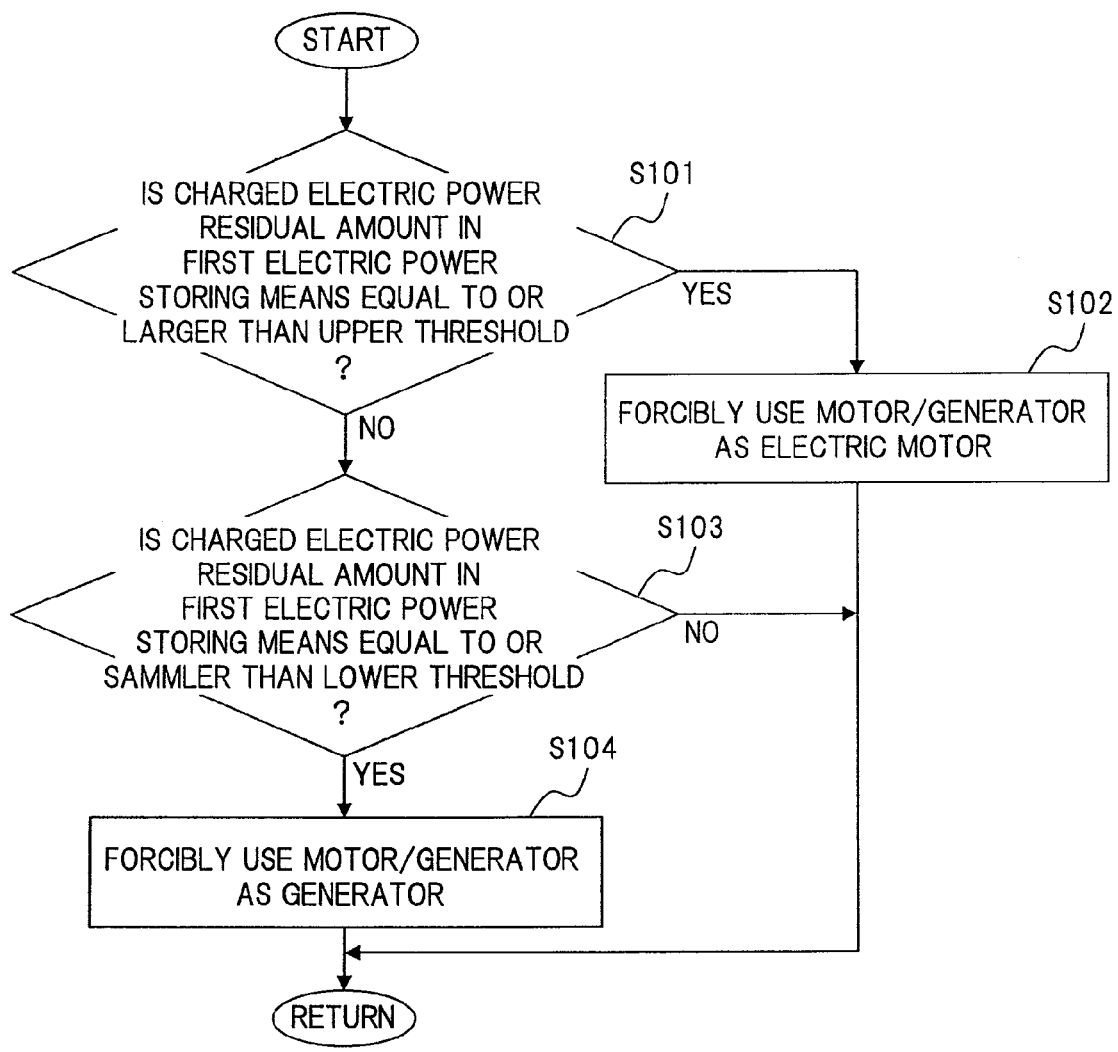
FIG. 14 is a flowchart illustrating the changing-over between the driving and the electric-power generating of the rotating electric machine, at the time when a negative torque is output, according to a second embodiment of the present invention.

FIG. 14 illustrates a flowchart of changing-over between the driving and the electric power generating of motor/generator 22 by ECU 20 when the negative torque is output, according to the present embodiment.

In step S101, it is judged whether or not the charged electric power residual amount in battery 101 is equal to or larger than an upper limit threshold.

Figure 15:
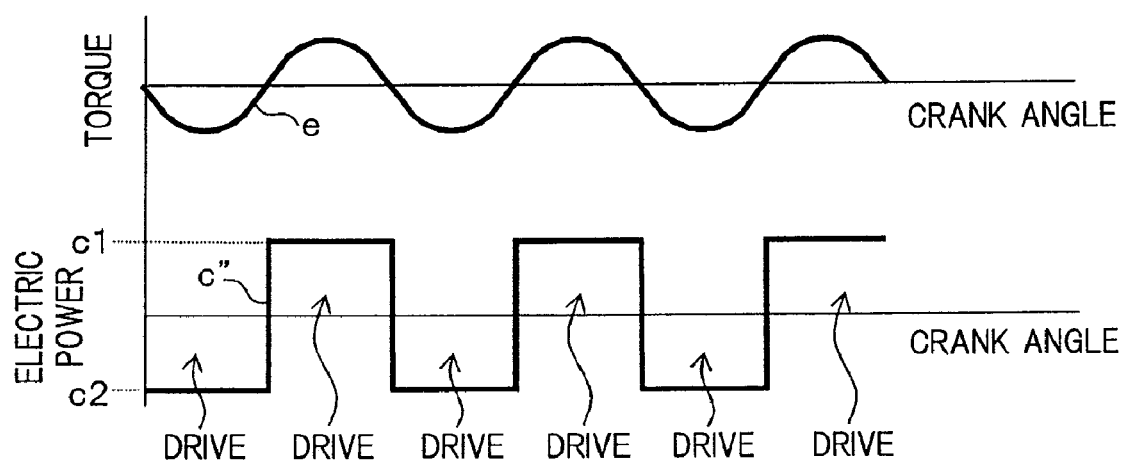
FIG. 15 is an explanatory diagram of the negative torque applied to the crankshaft when the rotating electric machine functions as an electric motor, according to the second embodiment of the present invention.

If it is judged in step S101 that the charged electric power residual amount in battery 101 is equal to or larger than the upper limit threshold, the routine proceeds to step S102 where motor/generator 22 is forcibly used as the electric motor to thereby apply the negative torque to crankshaft 13 (refer to a line "c''''" of FIG. 15). As a result, the electric power charged to battery 101 is forcibly consumed by motor/generator 22 so that the overcharge to battery 101 can be avoided.

On the other hand, if it is judged in step S101 that the charged electric power residual amount in battery 101 is smaller than the upper limit threshold, the routine proceeds to step S103.

In step S103, it is judged whether or not the charged electric power residual amount in battery 101 is equal to or smaller than a lower limit threshold. This lower limit threshold is set at a value smaller than the upper limit threshold.

If it is judged in step S103 that the charged electric power residual amount in battery 101 is equal to or smaller than the lower limit threshold, the routine proceeds to step S104 where motor/generator 22 is forcibly used as the generator to apply the negative torque to crankshaft 13 (refer to the line "c" of FIG. 10). As a result, the generated electric power of motor/generator 22 is forcibly charged to battery 101 so that the over-discharge to battery 101 can be avoided.

On the other hand, if it is judged in step S103 that the charged electric power residual amount in battery 101 is larger than the lower limit threshold, it is judged that there is no concern of the overcharge or the over-discharge to/from battery 101, the routine is returned. In this case, motor/generator 22 may perform the electric power generating (refer to the line "c" of FIG. 10) as the generator or may perform the driving (refer to the line "c''''" of FIG. 15) as the electric motor, in order to apply the negative torque to crankshaft 13.

The lower limit threshold and the upper limit threshold may be set within a range where the over-discharge or the overcharge to/from battery 101 can be reliably avoided.

The first embodiment and the second embodiment can be modified as follows.

Firstly, also on the exhaust side, there may be disposed VEL which continuously and variably controls a lift amount of exhaust valve 10 and an operating angle thereof. As a result, in the cylinder in which the combustion is temporarily stopped, the lift amount of exhaust valve 10 is controlled at minimum or exhaust valve 10 is fixed at a slightly opening state or a slightly closing state, to thereby reduce rotating resistance acting on crankshaft 13, so that the torque variation can be reduced.

Incidentally, when both of intake valve 7 and exhaust valve 10 of the cylinder in which the combustion is temporarily stopped are fixed at valve closing states, since the air intake performance and the exhaust performance are stopped, a pumping loss can be further reduced. For example, in order to fix intake valve 7 at the valve closing state, control shaft 23 may be further rotated in clockwise as shown in FIG. 4 or a mechanism which release the cooperation between intake valve 7 and intake cam 34 may be disposed. Similarly to this, exhaust valve 10 can also be fixed at the valve closing state.

Both of intake valve 7 and exhaust valve 10 of the cylinder in which the combustion is temporarily stopped are fixed at the valve closing states, resulting in a two cycle state of a compression stroke and an expansion stroke. Then, since an amount of air confined to the cylinder of which operation is temporarily stopped on a low piston position becomes larger, the negative torque applied to crankshaft 13 becomes larger in the compression stroke, while becoming smaller in the expansion stroke. Similarly, since the amount of air confined to the cylinder of which operation is temporarily stopped on a high piston position becomes smaller, the negative torque applied to crankshaft 13 becomes smaller in the compression stroke, while becoming larger in the expansion stroke. Thus, the torque variation may occur due to uneven negative torques between cylinders.

Therefore, a configuration may be such that the amounts of air confined and the strokes at cylinder operations temporarily stopping time are compared between cylinders, to thereby determine the cylinder of which operation is to be temporarily stopped so that the negative torques are equalized, or, intake valve 7 and exhaust valve 10 of the cylinder of which operation is temporarily stopped are operated to open or close immediately after the cylinder operation is temporarily stopped, to regulate the amounts of confined air between cylinders. For example, the amounts of air confined to the cylinders in which the combustion is temporarily stopped may be made at approximately equal amounts. Thus, it is possible to suppress the torque variation due to the uneven negative torques between cylinders.

Next, the electric power for driving electric actuator 36 of VEL 16 can be covered by the electric power generated by motor/generator 22, by supplying at least a part thereof from battery 101. In this case, the driving control or the electric power generating control of motor/generator 22 can be changed over, according to an electric power state including the electric power for driving electric actuator 36 as well as the charged electric power residual amount in battery 101.

Further, in place of the configuration in which motor/generator 22 is newly disposed for the vibration-damping of internal combustion engine 1, the torque variation may be suppressed by the negative torque at the electric power generating time using an alternator previously provided in the vehicle. In this case, although there is a possibility that either the electric power generating by the alternator or the discharge of battery 101 should mainly be performed depending on the charged electric power residual amount in battery 101 being the electric power storage device of the vehicle body, there is a little need to modify an existing vehicle configuration provided with the alternator, thereby suppressing the cost performance.

Or, the cost performance can also be suppressed, by disposing a direct-current motor in place of motor/generator 22 to apply the vibration-damping torque to crankshaft 13 by the direct-current motor.

Figure 16:
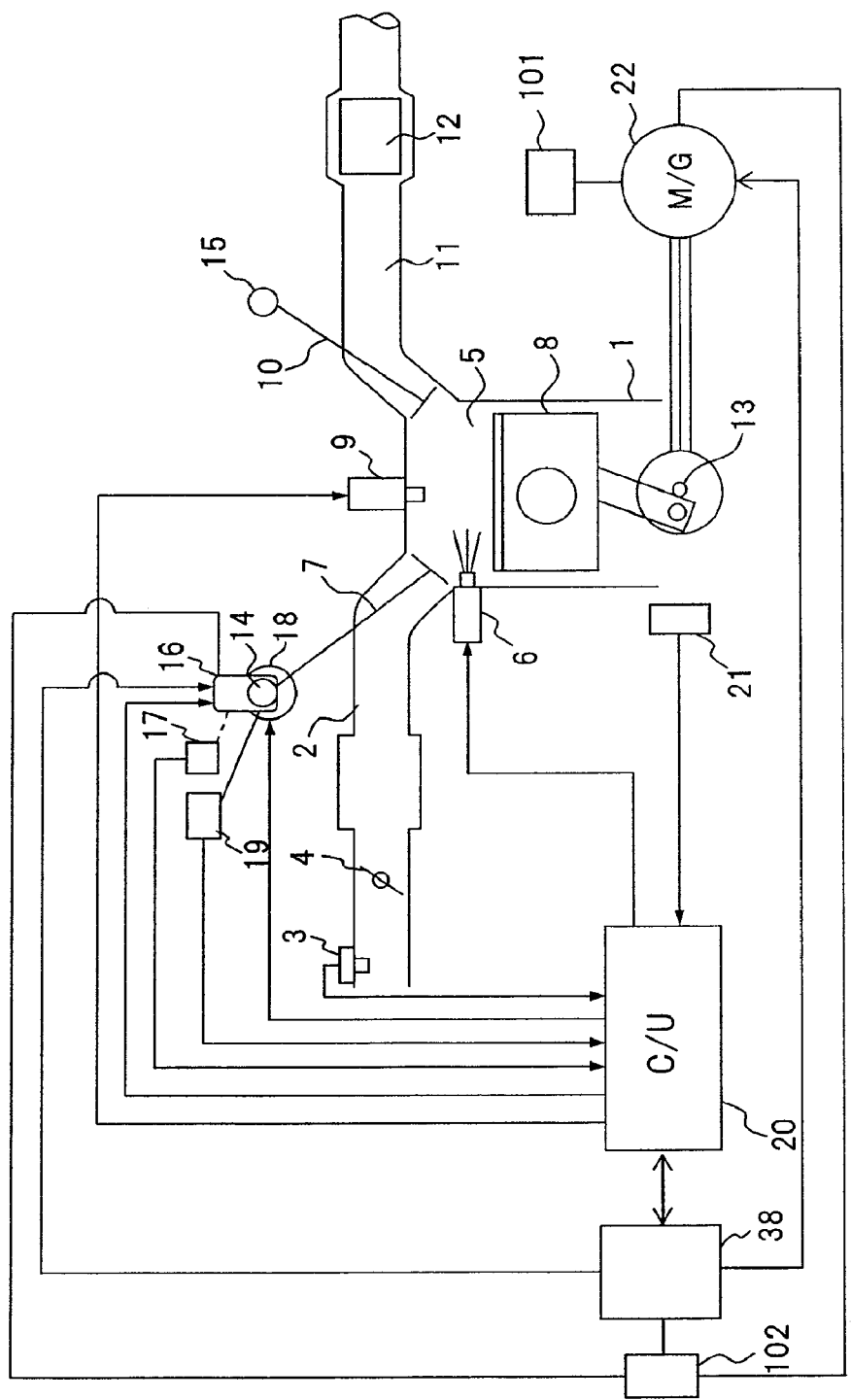
FIG. 16 is a system configuration diagram in which a second electric power storage device and a sub-control unit are provided, in the first or second embodiment of the present invention.

Next, as illustrated in FIG. 16, the configuration may be such that a second electric power storage device 102 such as a battery which is a separate body from battery 101 or a capacitor, and at least a part of the electric power for driving electric actuator 36 of VEL 16 is supplied from second electric power storage device 102. In this case, the electric power generated by motor/generator 22 to be charged to second electric power storage device 102 and the electric power to be supplied to electric actuator 36 or motor/generator 22 from second electric power storage device 102 may be set according to a charged electric power residual amount in second electric power storage device 102. As a result, it is possible to drive electric actuator 36, independently of the charged electric power residual amount in battery 101 being the electric power storage device of the vehicle body.

Further, according to the charged electric power residual amounts in battery 101 and second electric power storage device 102, at least a part of the electric power charged thereto may be made to be mutually supplied between battery 101 and second electric power storage device 102. As a result, it is possible to easily manage the electric power of the vehicle so as to avoid the over-discharge or the overcharge from/to battery 101 and second electric power storage device 102.

Furthermore, in FIG. 16, ECU 20 is used as a main control unit, and an electronic controller 38 (a sub-control unit) which is a separate body from ECU 20 and is capable of intercommunicating with ECU 20 is disposed. Thus, among the respective controls, such as, the driving controls of VEL 16 and VTC 18, the driving control or the electric power generating control of motor/generator 22, the charge and discharge controls of battery 101 and second electric power storage device 102 and the like, the controls closely relating to each other are collectively performed by electronic controller 38, so that the respective controls can be efficiently performed. FIG. 16 illustrates an example in which the driving control of VEL 16 and the driving control or the electric power generating control of motor/generator 22 are performed by electronic controller 38. Further, in ECU 20, since burdens in various controls can be reduced, overheat with the various controls can be suppressed. Incidentally, it is preferable that the management of the charged electric power residual amount in battery 101 or second electric power storage device 102, the driving control or the electric power generating control of motor/generator 22 and the like are performed, in consideration of the power consumption of at least one of electric actuator 36 of VEL 16 and electronic controller 38. Further, it is also possible to supply the electric power to electric actuator 36 of VEL 16 and electronic controller 38 from second electric power storage device 102.

Still further, it is also possible to configure the various devices for vibration-damping of internal combustion engine 1 independently of the vehicle or internal combustion engine 1, to mount them on the existing vehicle in a state where a control target value and the like are previously set. Thus, the various devices can be additionally disposed to the vehicle at a low cost without significantly modifying a layout of the vehicle.

Even still further, in a configuration in which the cylinders of internal combustion engine 1 form a plurality of banks and VEL 16 can be controlled in each bank unit, it is possible to control the valve lift amount of intake valve 7 in each bank unit, to thereby temporarily stop the operation of the cylinders. Thus, it becomes possible to achieve the efficient control by the simple configuration, and also, it is possible to suppress at minimum the torque variation in crankshaft 13 due to the uneven explosion intervals.

The entire contents of Japanese Patent Application No. 2007-318206 filed on Dec. 10, 2007 and, a priority of which is claimed, are incorporated herein by reference.

While only selected embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and its equivalents.

I claim:

1. A vibration-damping control apparatus for an internal combustion engine, comprising:
   a variable valve mechanism which varies a valve lift amount of at least one of an intake valve and an exhaust valve of the internal combustion engine;
   a rotating electric machine which has at least one of functions of an electric motor and a generator, capable of mutually transmitting a torque to/from an output shaft of the internal combustion engine; and
   a control unit comprising
   a cylinder combustion control section that temporarily stops the combustion in some cylinders among a plurality of cylinders of the internal combustion engine, to operate the internal combustion engine by the combustion in the remaining cylinders other than the cylinders in which the combustion is temporarily stopped;
   a variable valve mechanism control section that controls the variable valve mechanism, to decrease the valve lift amount of at least one of the intake valve and the exhaust valve of each cylinder in which the combustion is temporarily stopped; and a rotating electric machine control section that controls the rotating electric machine, to apply, to the output shaft, a torque for suppressing torque variation in the output shaft at the time when the combustion is temporarily stopped in some cylinders; wherein, when the combustion is temporarily stopped in some cylinder, the rotating electric machine control section controls the rotating electric machine to apply a torque for preventing a rotation of the output shaft in a state where a varying torque of the output shaft is larger than a target torque, and controls the rotating electric machine to apply the torque for accelerating the rotation of the output shaft in a state where the varying torque of the output shaft is smaller than the target torque;

the rotating electric machine has functions of the electric motor and the generator by being configured by a single body or a plurality of bodies; and when the combustion is temporarily stopped in some cylinders, the rotating electric machine control section controls the rotating electric machine to function as the generator to thereby apply the torque for preventing the rotation of the output shaft in the state where the varying torque of the output shaft is larger than the target torque, and controls the rotating electric machine to function as the electric motor to thereby apply the torque for accelerating the rotation of the output shaft in the state where the varying torque of the output shaft is smaller than the target torque;

the apparatus further comprises:
  a first electric power storage device capable of charging therein generated electric power of the rotating electric machine functioning as the generator, and also, capable of supplying the electric power to the rotating electric machine functioning as the electric motor; and
  an electric power state detecting section included in the control unit, that detects an electric power state including a charged electric power residual amount in the first electric power storage device; and the rotating electric machine control section controls the rotating electric machine while changing over between the torque applied by the function of the generator and the torque applied by the function of the electric motor, according to the electric power state detected by the electric power state detecting section, when controlling the rotating electric machine to apply the torque for preventing the rotation of the output shaft.

2. The apparatus according to claim 1
wherein the control unit further comprises;
a torque variation storing section that previously stores data of torque variation in the output shaft at the time when the combustion is temporarily stopped in some cylinders, and
wherein the rotating electric machine control section controls the rotating electric machine, based on the data of torque variation output from the torque variation storing section.

3. The apparatus according to claim 1
wherein the control unit further comprises a torque variation detecting section that detects the torque variation in the output shaft when the combustion is temporarily stopped in some cylinders; and wherein the rotating electric machine control section controls the rotating electric machine, based on a detection value of the torque variation output from the torque variation detecting section.

4. The apparatus according to claim 1, wherein the rotating electric machine is configured by a single body having the function of the electric motor, and when the combustion is temporarily stopped in some cylinders, the rotating electric machine control section controls the rotating electric machine to apply the torque opposite to each other between the state where the varying torque of the output shaft is larger than the target torque and the state where the varying torque of the output shaft is smaller than the target torque.

5. The apparatus according to claim 1, wherein the variable valve mechanism is configured to be driven by the electric power, the control unit is configured to be divided into a sub-control unit including the variable valve mechanism control section and a main control unit, and the electric power state detecting section detects the electric power state including the electric power consumption of at least one of the variable valve mechanism and the sub-control unit.

6. The apparatus according to claim 5, further comprising;
a second electric power storage device capable of charging therein the generated electric power of the rotating electric machine functioning as the generator, and also, capable of supplying the electric power to the variable valve mechanism and the sub-control unit.

7. The apparatus according to claim 1, wherein the cylinders of the internal combustion engine are divided into a plurality of cylinder groups, the variable valve mechanism is disposed to be commonly used for the cylinders in the same group, and the cylinder combustion control section temporarily stops the combustion in the all cylinders in the same group.

8. The apparatus according to claim 1, wherein, when the combustion is temporarily stopped in some cylinders, the rotating electric machine control section controls the rotating electric machine to apply, to the output shaft, the torque for suppressing the torque variation in the output shaft due to uneven cylinder explosion intervals.

9. A vibration-damping control method for an internal combustion engine, comprising the steps of:

temporarily stopping the combustion in some cylinders among a plurality of cylinders of the internal combustion engine, to operate the internal combustion engine by the combustion in the remaining cylinders other than the cylinders in which the combustion is temporarily stopped;

controlling a variable valve mechanism which varies a valve lift amount of at least one of an intake valve and an exhaust valve of each cylinder of the internal combustion engine, to decrease the valve lift amount of at least one of the intake valve and the exhaust valve of each cylinder in which the combustion is temporarily stopped; and controlling a rotating electric machine which has at least one of functions of an electric motor and a generator, to apply, to an output shaft of the internal combustion engine, a torque for suppressing torque variation in the output shaft at the time when the combustion is temporarily stopped in some cylinders; wherein, when the combustion is temporarily stopped in some cylinders, the step of controlling the rotating electric machine to apply the torque to the output shaft controls the rotating electric machine to apply a torque for preventing a rotation of the output shaft in a state where a varying torque of the output shaft is larger than a target torque, and controls the rotating electric machine to apply the torque for accelerating the rotation of the output shaft in a state where the varying torque of the output shaft is smaller than the target torque;

the rotating electric machine has functions of the electric motor and the generator by being configured by a single body or a plurality of bodies;

when the combustion is temporarily stopped in some cylinders, the step of controlling the rotating electric machine to apply the torque to the output shaft controls the rotating electric machine to function as the generator to thereby apply the torque for preventing the rotation of the output shaft in the state where the varying torque of the output shaft is larger than the target torque, and controls the rotating electric machine to function as the electric motor to thereby apply the torque for accelerating the rotation of the output shaft in the state where the varying torque of the output shaft is smaller than the target torque; and the step of controlling the rotating electric machine to apply the torque to the output shaft controls the rotating electric machine while changing over between the torque applied by the function of the generator and the torque applied by the function of the electric motor, according to an electric power state including a charged electric power residual amount in a first electric power storage device capable of charging therein generated electric power of the rotating electric machine functioning as the generator, and also, capable of supplying the electric power to the rotating electric machine functioning as the electric motor, when controlling the rotating electric machine to apply the torque for preventing the rotation of the output shaft.

10. The method according to claim 9, wherein the step of controlling the rotating electric machine to apply the torque to the output shaft controls the rotating electric machine, based on previously stored data of torque variation in the output shaft at the time when the combustion is temporarily stopped in some cylinders.

11. The method according to claim 9 wherein the step of controlling the rotating electric machine to apply the torque to the output shaft detects the torque variation in the output shaft when the combustion is temporarily stopped in some cylinders, and controls the rotating electric machine, based on a detection value of the torque variation.

12. The method according to claim 9, wherein the rotating electric machine is configured by a single body having the function of the electric motor, and when the combustion is temporarily stopped in some cylinders, the step of controlling the rotating electric machine to apply the torque to the output shaft controls the rotating electric machine to apply the torque opposite to each other between the state where the varying torque of the output shaft is larger than the target torque and the state where the varying torque of the output shaft is smaller than the target torque.

13. The method according to claim 9, wherein the cylinders of the internal combustion engine are divided into a plurality of cylinder groups, the variable valve mechanism is disposed to be commonly used for the cylinders in the same group, and the step of temporarily stopping the combustion in some cylinders among the plurality of cylinders temporarily stops the combustion in the all cylinders in the same group.

\* \* \* \* \*